United States Patent Office 3,247,203
Patented Apr. 19, 1966

3,247,203
CAFFEINE ACETYL TRYPTOPHANATE
Yves Louis René Barré, Paris, Jean Louis Mollé, Villeneuve-St.-Georges, and Maurice Gustave Eugène Vigneron, Paris, France, assignors to A.E.C. Societe de Chimie Organique et Biologique, Commentry, Allier, France, a corporation of France
No Drawing. Filed Feb. 19, 1963, Ser. No. 259,724
Claims priority, application France, Feb. 22, 1962, 888,884
1 Claim. (Cl. 260—253)

The present invention relates to caffeine acetyl tryptophanate, a process for its preparation and therapeutic compositions containing it.

Caffeine acetyltryptophanate is a new compound which has in particular a stimulating action, not followed by depression, on the central nervous system, an action on the vagotonic states, on hypoglycemia, a vasodilating action on the renal and myocardial irrigation, a psychotonic action, a corrective action on the secondary effects of neuroleptics, an anti-depressive action on its own and in association with psycho-analeptics and thymoleptics, an action on the adynamia of the elderly and an action on the large psychiatric syndromes by central action.

Caffeine acetyl tryptophanate is a compound chemically defined by the following empirical formula:

$$C_{21}H_{24}N_6O_5$$

and structural formula:

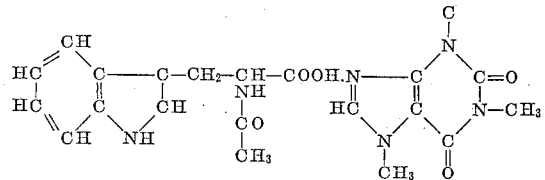

Its molecular weight is 440.45 and its molecular composition corresponds to:

| | Percent |
|---|---|
| Acetyl tryptophane | 55.91 |
| Caffeine | 44.09 | and its elementary composition corresponds to:

| | Percent |
|---|---|
| Carbon | 57.26 |
| Hydrogen | 5.49 |
| Nitrogen | 19.09 |
| Oxygen | 18.16 |

Caffeine acetyl tryptophanate has the following physical properties:

White crystalline powder
Very slightly soluble in cold water and more soluble at 100° C. (one part in 70 parts)
Slightly soluble in 50% alcohol (one part in 120 parts), more soluble at boiling point (one part in 12 parts)
Slightly soluble in 95% ethanol (one part in 95 parts), more soluble at boiling point (one part in 10 parts).
Melting point: 159° C.

According to the invention caffeine acetyl tryptophanate is prepared by reacting together roughly equimolecular amounts of acetyl tryptophan and caffeine.

According to another feature of the invention the reaction is carried out in a medium preventing hydrolysis. This medium is constituted by anhydrous aliphatic alcohol such as absolute ethanol, methanol etc. Absolute ethanol is preferred.

An example of one manner of carrying out the process of the invention will now be given, it being understood that the invention is not intended to be limited thereto.

EXAMPLE

Place into a 5 litre flask provided with a reflux refrigerator and a mechanical stirrer:

| | |
|---|---|
| Acetyl tryptophane, g. | 619 |
| Caffeine, g. | 485 |
| Absolute ethanol, ml. | 2,500 |

Reflux it gradually until boiling point with constant stirring. After 20 minutes add 60 ml. of water.

The solution becomes complete. Maintain it for 5 minutes at boiling point. Filter. Rinse with absolute ethanol. Allow to cool progressively while refluxing and stirring. Maintain the stirring while the crystals multiply and become an abundant mass. Maintain for 24 hours at cool temperature. Drain. Wash three times with absolute ethanol. Dry in a drying oven at 40° C. The weight obtained is 910 g., corresponding to a yield of 82.7%.

The prepared product can be identified by the following reactions.

(a) Place in a test tube around 10 mg. of caffeine acetyl tryptophanate and 3 ml. of 2% solution of paradimethylaminobenzaldehyde in 20% dilute hydrochloric acid. Stir so as to dissolve and then add a few drops of oxygenated water concentrated solution. After a few minutes a deep blue colouring appears.

(b) Place in a test tube around 10 mg. of caffeine acetyl tryptophanate, 5 ml. of water and a few drops of dilute ammonia in sufficient amount to dissolve the salt. Place the test tube in a boiling water bath. After 5 minutes an intense reduction of silver nitrate occurs with the appearance of a silver black powder capable of forming a silver mirror.

The following quantitative determinations can be carried out on caffeine acetyl tryptophanate so as to check its purity:

(a) Total nitrogen titration according to the method of French Codex 1949.

(b) A second method employed operates by acidimetry by back titration.

A millimolecule is treated with an excess amount of decinormal sodium hydroxide. The excess is titrated with decinormal sulphuric acid.

1 ml. of decinormal sodium hydroxide equals 0.0440 g. of caffeine acetyl tryptophanate.

The pharmacological study of caffeine acetyl tryptophanate revealed the following:

(1) *Toxicity*

The toxicity of caffeine acetyl triptophanate was studied by the oral route in the Swiss mouse having an average weight of 20 g., and in the rat.

The product was administered in an aqueous suspension.

The LD$_{50}$ calculated in accordance with the method of Behrens and Karber is 1.055 g. per kg. of body weight in the mouse; in the rat it is 1.700 g.

(2) Pharmacodynamic properties

Caffeine acetyl tryptophanate is an exciting agent of the central nervous system whose induction period is slow owing to its low solubility but whose action is of prolonged duration.

It increases the motor activity of the mouse and the rat in creating a mild but prolonged excitation without characteristic aggressivity phenomena.

It does not have a truly significant antagonism relative to chloral, mebubarbital, phenobarbital. Its antagonistic action is perhaps more distinct in respect of sodium hexobarbital.

It does not, or only slightly, modifies the duration of anaesthesia with ether.

No difference is observed on cardiazolic shock but caffeine acetyl tryptophanate increases and awakens the convulsing action of strychnine at the threshold does.

No distance action of caffeine acetyl tryptophanate is observed on the arterial pressure or the heart.

Caffeine acetyl tryptophanate has the advange over usual exciting agents (benzedrine, xanthic bases and other agents) of not producing depressive phenomena following on the tonicity phase and thus permits a material acceleration of recovery from the depressive states from both from the nervous and muscular points of view.

Its asthenic effect was revealed by the swimming test in the rat.

It exerts a corrective action on the secondary effects of neuroleptics (chlorpromazine and levopromazine) and therefore permits a recovery from the depressive states created by the latter, hence its interest in prolonged treatments by neuroleptics.

It only slightly modifies the appetite and consequently acts as a maintenance medicine which does not have the drawbacks of the usual exciting agents.

A transitory hyperglycemia inducing effect occurs after ingestion of caffeine acetyl tryptophanate.

According to these data it appears that caffeine acetyl tryptophanate is capable of playing an important part, owing to its psychotonic action, in correcting the asthenic and adynamic states. It permits recovery from depressive states.

The therapeutic applications of caffeine acetyl tryptophanate result from these properties.

Caffeine acetyl tryptophanate has an electively stimulating action on the vegetative nervous system and the mental tonus of the individual.

Its administration in man usually results in an increase in urinary catecholamines which is manifested by a medullo-adrenal stimulation.

Owing to this mechanism, it consequently results in a conversion of the blood sugars into glucose which can be directly assimilated by the nervous tissue.

Under the direct medullo-adrenal excitation and indirect excitation by the normoglucosemia-inducing effect, the tonus of the mesocephalic reticulated substance is increased whence a thymic and vegetative stimulation of the subject.

Caffeine acetyl tryptophanate slowly decomposes and permits obtaining a retarding effect without secondary depression whereas a parasitic cardiac excitation becomes exceptional.

Caffeine acetyl tryptophanate can be administered at doses ranging between 0.10 and 3 g. per 24 hours and even more, the upper limit being solely determined by the clinical states existing before and developing in the course of treatment.

It is advantageously put in the form of unit doses for administration by the oral route such as tablets, pills and in granular form, etc., and for administration by the rectal route in the form of suppositories, the caffeine acetyl tryptophanate being associated in these unit doses with therapeutically administrable vehicles or excipients appropriate to the contemplated method of administration.

The other administration routes and pharmaceutical forms are not excluded and there will be mentioned in particular injectable solutions obtained by the solubilization of the compound in appropriate adjuvants. The unit doses can contain about 0.10–0.50 g. of active compound.

There now will be mentioned some pharmaceutical preparations of caffeine acetyl tryptophanate, it being understood that the invention is not intended to be limited thereto.

(1) *Tablets:* G.
(a) Caffeine acetyl tryptophanate excipient to make up one tablet _____ 0.10
(b) Caffeine acetyl tryptophanate excipient to make up one tablet _____ 0.50

(2) *Suppositories:*
(a) Caffeine acetyl tryptophanate excipient to make up one suppository _____ 0.10
(b) Caffeine acetyl tryptophanate excipient to make up one suppository _____ 0.50

The weak medicinal units (for example 0.10 g. tablets) are preferably intended for current practice and obtain the following results with remarkable regularity:

(1) *Biological results.*—(a) The correction with 1 or 2 tablets per day of functional hypoglycemia or hypoglycosemia in particular when the latter coincides with a normal level of total reducing sugars in the blood.

(b) Comparative curves without and with caffeine acetyl tryptophanate clearly reveal the prolonged adrenaline-like effect of the compound with a perfect tolerance.

(c) In certain cases, as mentioned before, the urinary catecholamines level was increased.

(d) No congestive effect of the serotonine type was observed.

(e) It has a vasodilating action on the renal and myocardial irrigation.

(2) *Clinical effects: Caffeine acetyl tryptophanate.*—
(a) Corrects the hypoglycemic states in slightly anxious conditions and above all in cyclothymic cases.

(b) It sustains patients having vagotonic tendencies who are slender, thin and often hypometabolic. The same compound prevents a large extent the migraine of these patients the attacks being less frequent and less intense.

(c) It avoids certain paracomitial accidents related to fasting or hypoglycosemia.

(d) It exerts a psychosedative effect due to an improved assurance the lack of which created the anxiety.

The strong medicinal units (for example 0.50 g. tablets) are above all of utility in psychiatry.

At the daily dose of 0.50–2.50 g., the compound has the following therapeutic activities:

(a) Psychotonic action.
(b) Corrective action on the secondary effects of neuroleptics.
(c) An antidepressive action on its own and in association with psychoanaleptics and thymoleptics.
(d) Action in the third age: adynamia of the elderly.
(e) Action in large psychiatric syndromes by its effect on the central system, for instance, delirium tremens.

It must be understood that the invention is not intended to be limited to the described modes of carrying out the invention which have been given merely by way of example.

Having now described our invention what we claim as new and desire to secure by Letters Patent is:
Caffeine acetyl tryptophanate having the formula:
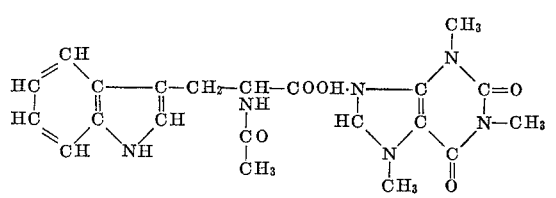
References Cited by the Examiner
UNITED STATES PATENTS
| | | | |
|---|---|---|---|
| 2,185,219 | 1/1940 | Nebenhaver | 167—65 |
| 2,681,901 | 6/1954 | Wiles et al. | 260—268 |
| 2,688,618 | 9/1954 | Cooper et al. | 260—256 |
| 2,700,667 | 1/1955 | Cooper et al. | 260—256 |
| 2,961,377 | 11/1960 | Shapiro et al. | 167—65 |
| 3,094,537 | 6/1963 | White | 260—319 |
FOREIGN PATENTS
790,557    2/1958    Great Britain.
NICHOLAS S. RIZZO, *Primary Examiner.*